United States Patent [19]

Sever

[11] Patent Number: 4,556,232

[45] Date of Patent: Dec. 3, 1985

[54] TRACTOR-TRAILER COUPLING DEVICE

[76] Inventor: John I. Sever, 4 Nancy Dr., St. Catharines, Ontario, Canada, L2M 1Y5

[21] Appl. No.: 603,268

[22] Filed: Apr. 23, 1984

[30] Foreign Application Priority Data

Sep. 20, 1983 [CA] Canada ............................... 437123

[51] Int. Cl.⁴ ............................................. B62D 53/08
[52] U.S. Cl. ..................................... 280/432; 280/433
[58] Field of Search ................................ 280/432, 433

[56] References Cited

U.S. PATENT DOCUMENTS 3,556,559  1/1971  Interisano ........................... 280/432
4,120,514 10/1978 Sanders ................................ 280/432

Primary Examiner—Joseph F. Peters, Jr.
Assistant Examiner—Donn McGiehan

[57] ABSTRACT

A safety device for use with the fifth wheel and kingpin of a tractor-semitrailer combination, in which an auxiliary pin is insertable through an aperture in the fifth wheel upwardly into an arcuate slot located on the underside of the semitrailer and concentric with the kingpin. The auxiliary pin is mounted in a carrier frame fixed to the underside of the fifth wheel. A sleeve is mounted on the carrier frame in axial alignment with the aperture in the fifth wheel, the auxiliary pin being slidable axially in the sleeve and having an arcuate cam groove in its cylindrical surface, an inwardly projecting follower pin of the sleeve engaging the arcuate groove. The auxiliary pin is advanced into, and retracted from, the arcuate slot and at the same time the interaction between the follower pin and the cam groove.

6 Claims, 6 Drawing Figures

TRACTOR-TRAILER COUPLING DEVICE

FIELD OF THE INVENTION

This invention relates to a safety device for use with a coupling for tractor and semitrailer of the type using a fifth wheel.

BACKGROUND OF THE INVENTION

Combination tractors and semitrailers using a fifth wheel are vulnerable to jackknifing on the highway under certain driving conditions. Also the trailer sometimes separates from the tractor during use. To overcome this problem an auxiliary kingpin has been devised as shown in Canadian Reissue Pat. No. 894,111 issued Feb. 29, 1972 to Auto-Mat Safety Devices assignee of Angelo Interisano entitled Safety Device for Tractor-Trailer Hook-Up Mechanism and U.S. Pat. No. 3,556,559 issued Jan. 19, 1971 to Auto-Mat Safety Devices assignee of Angelo Interisano entitled Tractor and Semitrailer Pivot Coupling with Interchangeable Trailer Plate.

Two problems are associated with the above-mentioned Interisano devices, namely (1) the apparatus, which uses a flexible cable for remote actuation of the auxiliary kingpin, is cumbersome and also subject to malfunction, and (2) the rudimentary bumpers associated with the limits of the arcuate travel of the auxiliary kingpin about the main kingpin are inadequate to absorb the shock of a jackknifing trailer.

It is an object of the present invention to provide an improved auxiliary kingpin actuator apparatus for a tractor and semitrailer combination.

It is another object of the invention to provide an improved bumper device for an auxiliary kingpin in a tractor and semitrailer combination.

SUMMARY OF THE INVENTION

Essentially the invention consists of a safety device for use with a tractor and semitrailer using a fifth wheel having a kingpin for coupling the tractor with the semitrailer, wherein an auxiliary pin is insertable through an aperture in the fifth wheel upwardly into an arcuate slot located on the underside of the semitrailer and concentric with the kingpin, the improvement comprising: a carrier frame fixed to the fifth wheel on the underside thereof; a sleeve mounted on the carrier frame in axial alignment with the aperture in the fifth wheel, the auxiliary pin being slidable axially in the sleeve and having an arcuate cam groove in cylindrical surface thereof, an inwardly projecting follower pin of the sleeve engaging the arcuate groove; means mounted on the carrier frame to advance the auxiliary pin into the arcuate slot and to retract the auxiliary pin therefrom, the auxiliary pin being rotated axially in the sleeve during said advancement and retraction thereof by the interaction of the follower pin and the cam groove. The device preferably includes a bumper located at each end of the arcuate slot on the semitrailer, the bumper comprising a housing having a well therein, a rigid pin slidable in the well, a resilient plug located in the well behind the pin whereby the pin projects from the housing into the end portion of the arcuate slot, and means to retain the pin in the well.

BRIEF DESCRIPTION OF THE DRAWINGS

An example embodiment of the invention is shown in the accompanying drawing in which.

DETAILED DESCRIPTION OF PREFERRED EMBODIMENT

Figure 1:
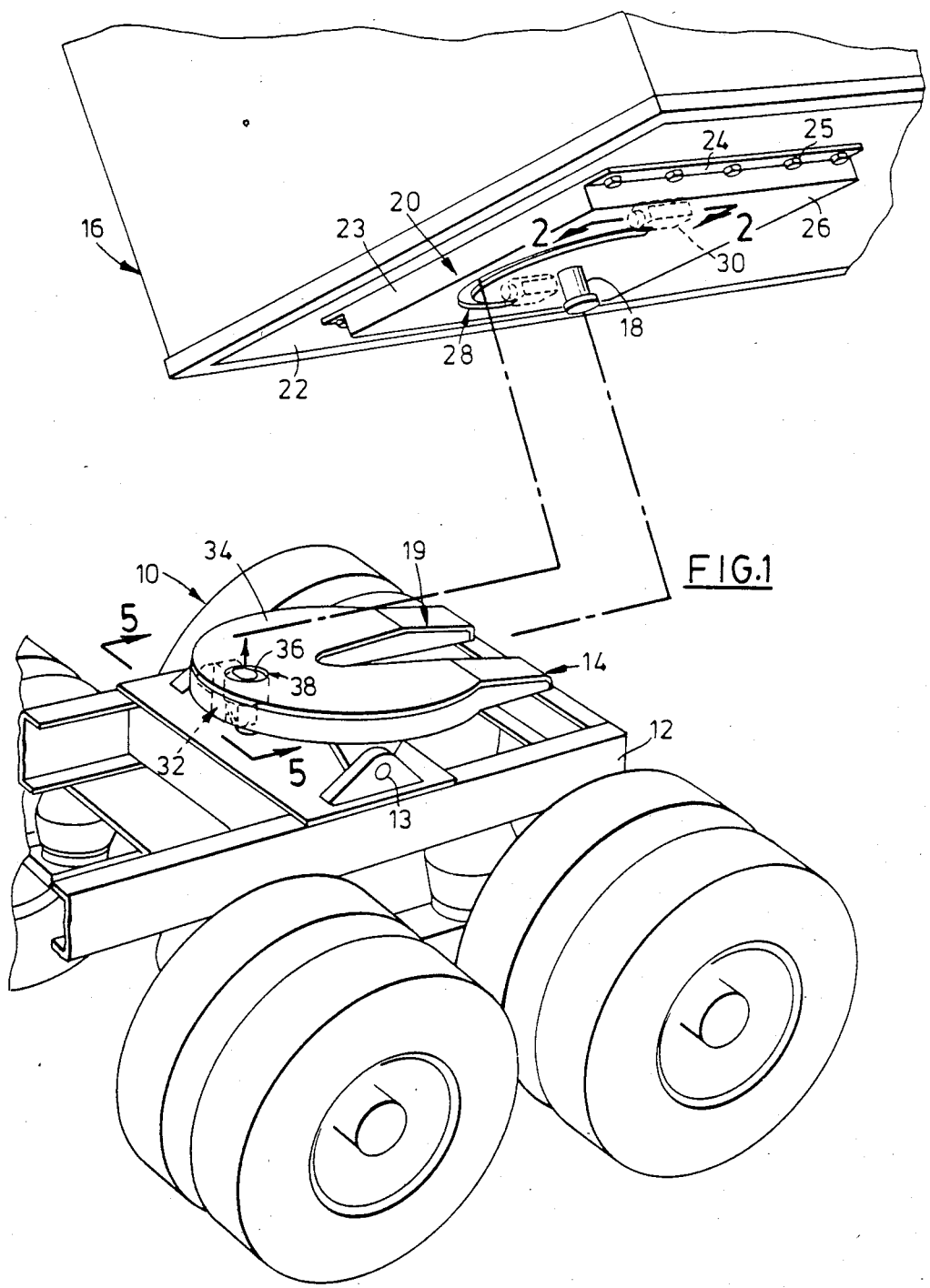
FIG. 1 is a perspective view of a fifth wheel mounting on the chassis of a tractor, together with an underside perspective view of a semitrailer carrying a kingpin and an associated housing enclosing a pair of bumpers.

In the example embodiment of FIG. 1 a tractor 10 has a chassis 12 on which a fifth wheel 14 is mounted by trunnions 13. Associated with tractor 10 is a semitrailer 16 which carries a kingpin 18 engageable with an open ended slot 19 of fifth wheel 14 in known manner.

Kingpin 18 is attached to a housing 20 which is fixed to the underside 22 of trailer 16. Housing 20 consists of a frame 23 having brackets 24 attached to underside 22 of the housing by bolts 25. A bottom plate 26 of housing 20 is spaced from underside 22 of the tralier and has an arcuate slot 28 concentric with the axis of kingpin 18. A pair of bumpers 30 are located within housing 20, the bumpers being fixed to plate 26, one at each end of slot 28.

An auxiliary pin assembly 32 is fixed to the underside of face plate 34 of fifth wheel 14 and includes a movable locking pin 36 axially concentric with an aperture 38 in the face plate of the fifth wheel. Pin 36 is aligned with slot 28 when kingpin 18 is engaged in slot 19 of fifth wheel 14 at the closed end of the slot. Assembly 32 comprises a carrier frame in the form of a base plate 40 with a sleeve 42 and a bracket 44 fixed to the base plate. Locking pin 36 is axially slidable in sleeve 42 and projects upwardly through an aperture 46 in base plate 40 and through aperture 38 of face plate 34, aperture 46 being aligned concentrically with aperture 38.

Mounted on bracket 44 is a reciprocable fluid actuated drive assembly 48 comprising a cylinder 50 fixed to the bracket and a piston having a piston rod 52 projecting into the bracket. Cylinder 50 is fed by flexible hoses 53 from a suitable fluid pressure source (not shown). Piston rod 52 is connected at its free end, by a pin 54, with one slotted end 55 of a bell crank arm 56 which is pivotally mounted in bracket 44 by a further pin 57. The other end 58 of crank arm 56 is bifurcated with a pair of opposed inturning pins 60 engaging a circumferential slot 62 in the lower end portion of locking pin 36. A cam groove 64 is also located in the cylindrical side wall of locking pin 36 and a cam follower 66 which is mounted on the internal side wall of sleeve 42 engages the cam groove. Sleeve 42 includes a grease port 67.

Figure 4:
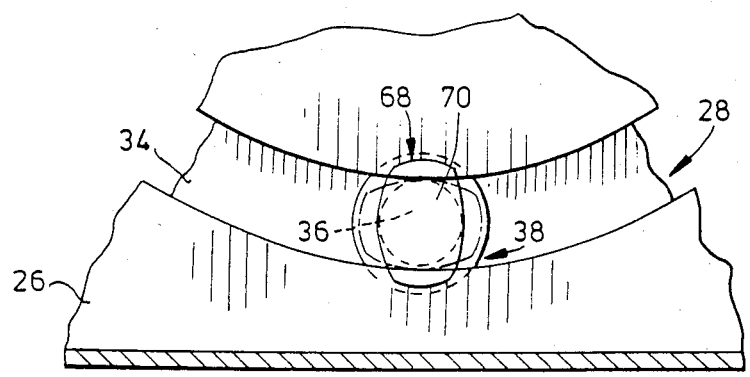
FIG. 4 is a fragmentary view of the fifth wheel of FIGS. 1 and 2 taken in the direction of arrows 3—3 of FIG. 2.
Figure 2:
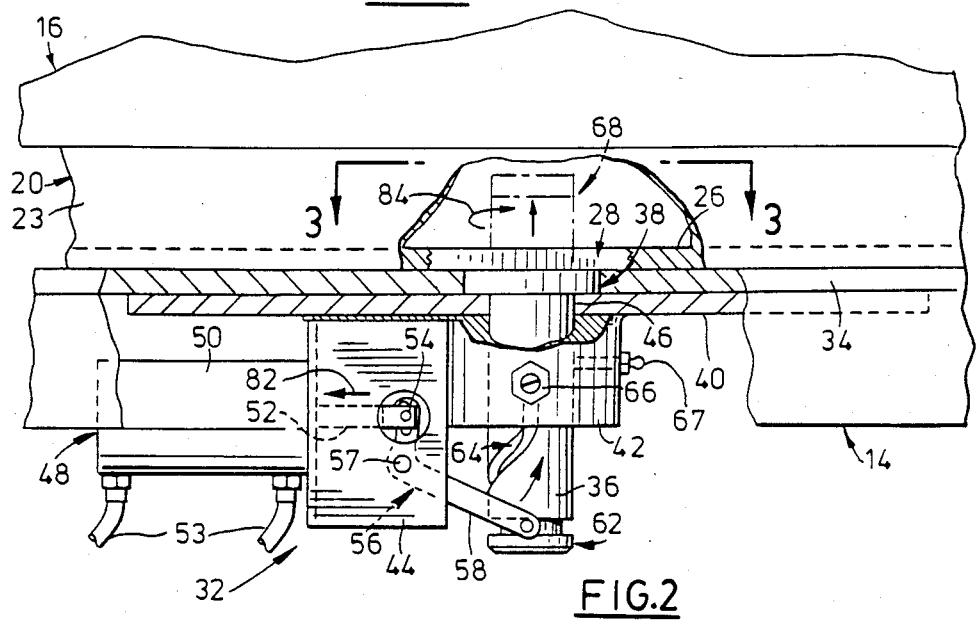
FIG. 2 is a view in elevation of the fifth wheel of FIG. 1, partly cut away, taken in the direction of arrows 2—2 of FIG. 1.

The upper end of locking pin 36 carries a cap 68. As seen in FIGS. 2 and 4, cap 68 has a pair of opposed wings 70, extending laterally from pin 36, which are accommodated in aperture 38 when the pin is in a lowered position. Arcuate slot 28 slightly larger than the diameter of locking pin 36 but narrower than the wingspan of cap 68.

Figure 5:
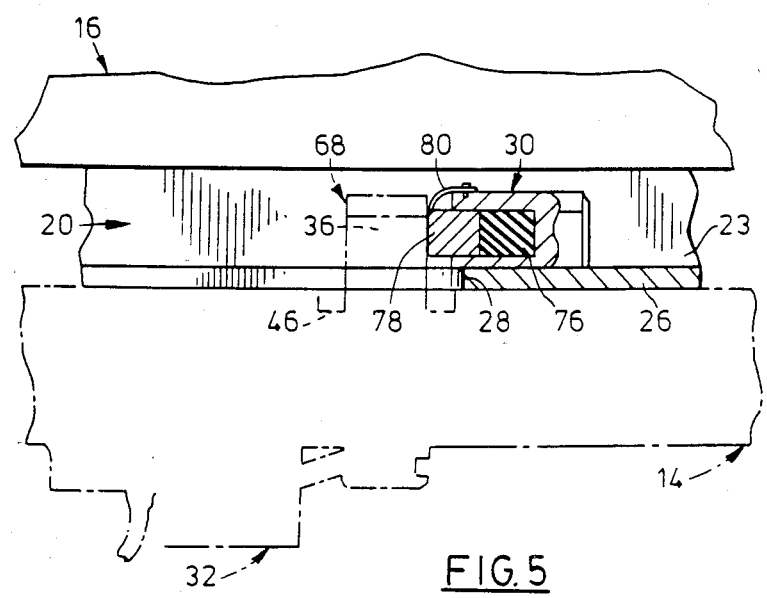
FIG. 5 is a cross-sectional view of a bumper of the housing taken along line 4—4 of FIG. 1.
Figure 6:
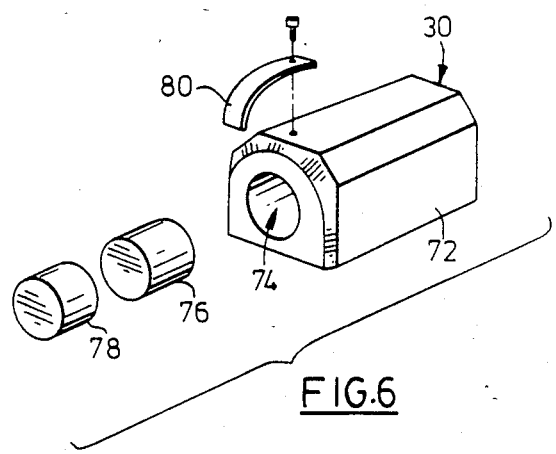
FIG. 6 is an exploded perspective view of the bumper of FIG. 5.

As seen in FIGS. 5 and 6, bumper 30 comprises a casing 72 with a well 74 extending inwardly from one end of the casing. A resilient plug 76 is positioned slidably in well 74 abutting the internal end of the well. Between the end of plug 76 and the opening of well 74, and projecting outwardly from casing 72, is a slidable rigid plug 78. Plugs 76 and 78 are retained in well 74 by a retaining spring 80 which is fixed to casing 72 and curves downwardly over the outwardly projecting end of plug 78. Casings 72 are fixed to the upper side of bottom plate 26, one at each end of slot 28.

Figure 3:
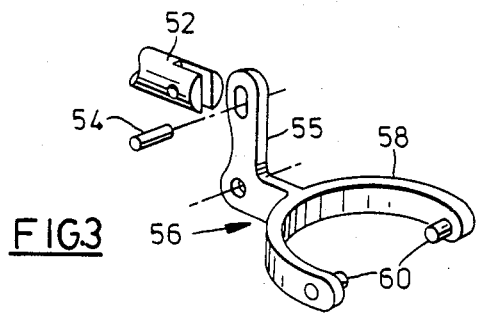
FIG. 3 is a perspective view of the crank arm shown in FIG. 2.

In the operation of the example embodiment semitrailer 16 is hitched to tractor 10 by locating kingpin 18 in slot 19 of fifth wheel 14 as seen in FIG. 1. When kingpin 18 is abutting the closed end of slot 19, hydraulic cylinder 50 is actuated to retract piston rod 52 as indicated by arrow 82 in FIG. 2, which moves locking pin 36 upward and at the same time rotates the locking pin, as indicated by arrow 84, by the interaction of cam groove 64 and cam follower 66. This action of locking pin 36 rotates cap 68 after it clears aperture 38 and slot 28, causing wings 70 to project over the lateral edges of slot 28 as seen in FIG. 3. In this raised position locking pin 36 provides an auxiliary locking action which is a safety device should kingpin 18 fail.

As tractor 10 turns in relation to semitrailer 16, locking pin 36 travels along slot 28 of housing 20. If the turn angle is severe, as when tractor-semitrailer combination jackknifes, locking pin 36 will reach the end of slot 28 which would damage the locking pin in the absence of a resilient bumper. In the device of the example embodiment locking pin 30 strikes rigid plug 80 of bumper 30, as seen in FIG. 5, and resilient plug 78 absorbs the shock.

I claim:

1. In a safety device for use with a tractor and semitrailer using a fifth wheel having a kingpin for coupling the tractor with the semitrailer, wherein an auxiliary pin is insertable through an aperture in the fifth wheel upwardly into an arcuate slot located on the underside of the semitrailer and concentric with the kingpin, the improvement comprising:

a carrier frame fixed to the fifth wheel on the underside thereof;
   a sleeve mounted on the carrier frame in axial alignment with the aperture in the fifth wheel, the auxiliary pin being slidable axially in the sleeve and having an arcuate cam groove in the cylindrical surface thereof, an inwardly projecting follower pin of the sleeve engaging the arcuate groove; and
   means mounted on the carrier frame to advance the auxiliary pin into the arcuate slot and to retract the auxiliary pin therefrom, the auxiliary pin being rotated axially in the sleeve during said advancement and retraction thereof by the interaction of the follower pin and the cam groove;
   the auxiliary pin having a circumferential groove adjacent the lower end thereof, the advancement and retraction means comprising a bell crank arm pivotably mounted on the carrier frame, one end of the crank arm having a yoke engagable with the groove of the auxiliary pin, and a fluid actuated cylinder and piston assembly mounted on the carrier frame with the piston connected to the other end of the crank arm.

2. A safety device as claimed in claim 1 in which the crank arm is pivotally mounted on a bracket fixed to the carrier frame, the cylinder of the fluid actuated assembly being fixed to the bracket.

3. A safety device as claimed in claim 1 or 2 in which the carrier frame is a plate fixed to the underside of the fifth wheel.

4. In a safety device for use with a tractor and semitrailer using a fifth wheel having a kingpin for coupling the tractor with the semitrailer, wherein an auxiliary pin is insertable through an aperture in the fifth wheel upwardly into an arcuate slot located on the underside of the semitrailer and concentric with the kingpin, the improvement comprising:

a carrier frame fixed to the fifth wheel on the underside thereof;
   a sleeve mounted on the carrier frame in axial alignment with the aperture in the fifth wheel, the auxiliary pin being slidable axially in the sleeve and having an arcuate cam groove in the cylindrical surface thereof, an inwardly projecting follower pin of the sleeve engaging the arcuate groove;
   means mounted on the carrier frame to advance the auxiliary pin into the arcuate slot and to retract the auxiliary pin therefrom, the auxiliary pin being rotated axially in the sleeve during said advancement and retraction thereof by the interaction of the follower pin and the cam groove; and
   a bumper located at each end of the arcuate slot on the semitrailer, the bumper comprising a housing having a well therein, a rigid pin slidable in the well, a resilient plug located in the well behind the pin whereby the pin projects from the housing into the end portion of the arcuate slot, and means to retain the pin in the well.

5. A safety device as claimed in claim 4 in which the crank arm is pivotally mounted on a bracket fixed to the carrier frame, the cylinder of the fluid actuated assembly being fixed to the bracket.

6. A safety device as claimed in claim 4 in which the carrier frame is a plate fixed to the underside of the fifth wheel.

* * * * *